United States Patent
Liu et al.

(10) Patent No.: US 10,652,009 B2
(45) Date of Patent: *May 12, 2020

(54) LOGIC CIRCUIT FOR CODEWORD SYNCHRONIZATION FOR FIBER CHANNEL PROTOCOL

(71) Applicant: INTERNATIONAL BUSINESS MACHINES CORPORATION, Armonk, NY (US)

(72) Inventors: Yang Fan Liu, Shanghai (CN); Kai Yang, Beijing (CN); Jilei Yin, Beijing (CN); Zhao Qing Zheng, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/039,874

(22) Filed: Jul. 19, 2018

(65) Prior Publication Data

US 2018/0323957 A1 Nov. 8, 2018

Related U.S. Application Data

(63) Continuation of application No. 15/628,784, filed on Jun. 21, 2017, now Pat. No. 10,103,871, which is a
(Continued)

(51) Int. Cl.
| | | |
|---|---|---|
| *H04L 7/04* | (2006.01) | |
| *H04L 12/40* | (2006.01) | |
| *H04L 25/49* | (2006.01) | |
| *H04L 12/24* | (2006.01) | |
| *H04L 12/28* | (2006.01) | |

(Continued)

(52) U.S. Cl.
CPC .............. *H04L 7/042* (2013.01); *H04L 12/40* (2013.01); *H04L 12/40182* (2013.01); *H04L 1/00* (2013.01); *H04L 12/28* (2013.01); *H04L 25/49* (2013.01); *H04L 41/082* (2013.01); *H04L 41/12* (2013.01); *H04L 45/563* (2013.01)

(58) Field of Classification Search
CPC ... H04L 12/40; H04L 12/40182; H04L 25/49; H04L 7/042; H04L 41/082; H04L 41/12; H04L 45/563; H04L 12/28; H04L 1/00
See application file for complete search history.

(56) References Cited

U.S. PATENT DOCUMENTS

| | | | |
|---|---|---|---|
| 4,288,664 A | 9/1981 | Araseki | |
| 6,771,720 B1 * | 8/2004 | Yang | .................... H03G 3/3068 375/345 |

(Continued)

OTHER PUBLICATIONS

Yang Liu et al., "Fast Synchronization Algorithm for the Forward Error Correction in IEEE Standard 802.3", SoC Design Conference, 2013 International, Nov. 17-19, 2013, abstract, IEEE Standard, section 74.

(Continued)

*Primary Examiner* — Mewale A Ambaye
(74) *Attorney, Agent, or Firm* — Steven Meyers; Andrew M. Calderon; Roberts Calderon Safran & Cole, P.C.

(57) ABSTRACT

Efficient codeword synchronization methods and systems for fiber channel protocol are disclosed. The method includes identifying a codeword boundary by detecting 100-bit known patterns in a bit codeword in a transmission.

14 Claims, 4 Drawing Sheets

Related U.S. Application Data continuation of application No. 14/750,110, filed on Jun. 25, 2015, now Pat. No. 9,768,950.

(51) Int. Cl.
*H04L 12/771* (2013.01)
*H04L 1/00* (2006.01)

(56) References Cited

U.S. PATENT DOCUMENTS

| | | |
|---|---|---|
| 8,108,756 B2 | 1/2012 | Ganga et al. |
| 8,255,779 B2 | 8/2012 | Booth |
| 8,495,478 B2 | 7/2013 | Liu et al. |
| 8,667,373 B2 | 3/2014 | He et al. |
| 8,689,089 B2 | 4/2014 | Wang et al. |
| 8,769,380 B1* | 7/2014 | Burd .................. H03M 13/1128 714/774 |
| 9,768,950 B2 | 9/2017 | Liu et al. |
| 2001/0050926 A1* | 12/2001 | Kumar .................. H04H 20/30 370/529 |
| 2002/0049954 A1 | 4/2002 | Watanabe et al. |
| 2007/0181078 A1 | 8/2007 | McFarland |
| 2008/0040643 A1 | 2/2008 | Effenberger |
| 2010/0293441 A1 | 11/2010 | Booth |
| 2014/0237323 A1 | 8/2014 | Yu et al. |
| 2016/0380714 A1* | 12/2016 | Liu .......................... H04L 7/042 370/513 |
| 2017/0366335 A1 | 12/2017 | Liu et al. |

OTHER PUBLICATIONS

Hao Yang et al., "Fast FEC Synchronization for 10G Ethernet Receiver", 2010 2nd International Conference on Information Science and Engineering, Dec. 4-6, 2010, abstract, IEEE.

Adam Healey, "32GFC Forward Error Correction (FEC) Proposal", LSI, Dec. 2012, pp. 1-17.

List of IBM Patents or Patent Applications Treated as Related 1 page.

* cited by examiner

LOGIC CIRCUIT FOR CODEWORD SYNCHRONIZATION FOR FIBER CHANNEL PROTOCOL

FIELD OF THE INVENTION

The invention relates to codeword synchronization and, more particularly, to efficient codeword synchronization methods and systems for fiber channel protocol.

BACKGROUND

In Fiber Channel (FC) protocol, FEC (Forward Error Correction) core is required to perform codeword synchronization to find the frame boundary on an FC lane. The process of synchronization is important and significantly impacts the performance of FC devices.

Based on the definition of standard FC-FS-4 rev 0.5, there are two kinds of codeword synchronization: "256B/257B Transmission Word synchronization" and "RS-FEC rapid codeword synchronization process". 256B/257B Transmission Word synchronization is used to perform synchronization in FC normal operation mode. "RS-FEC rapid codeword synchronization process", on the other hand, is used to perform rapid synchronization in FC LPI (Low Power Idle) mode.

Normal synchronization usually takes a large amount of time, the worst case goes up to 1 millisecond (ms) in 32 G lane speed. For example, as defined in FC-FS-4 rev0.5, normal codeword synchronization uses the syndrome to determine whether valid codeword is found, and the candidate positions of codeword boundary are 5280. Since only one syndrome can be calculated for 5280 bit codewords every time, it is very difficult to find the codeword boundary in parallel by using the suggested method found in FC-FS-4. Rapid synchronization greatly reduces the time to find codeword boundary, but it only can be used in the LPI mode, and needs to turn down the scrambler in the Physical Coding Sublayer (PCS) core, which would impact the DC balance. Also, the valid detection window is too small to bring up risk in the synchronization process.

SUMMARY

In an aspect of the invention, a method comprises identifying a codeword boundary by detecting 100-bit known patterns in a bit codeword in a transmission.

In an aspect of the invention, a method comprises detecting 20 dedicated 5-bit patterns for each 5-bit data in each transmission word of a codeword to determine a boundary of the codeword.

In an aspect of the invention, a logic circuit comprises: a Mux which is configured to combine sampled data bits into a single stream of data bits; compare and update logic which is configured to receive the single stream of data bits and detects all possible positions of the data bits in one transmission word, for each transmission word; and a pattern found counter which is configured to find a first 5 bits for each transmission word in order to find a boundary for a sequence of codewords.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 4:
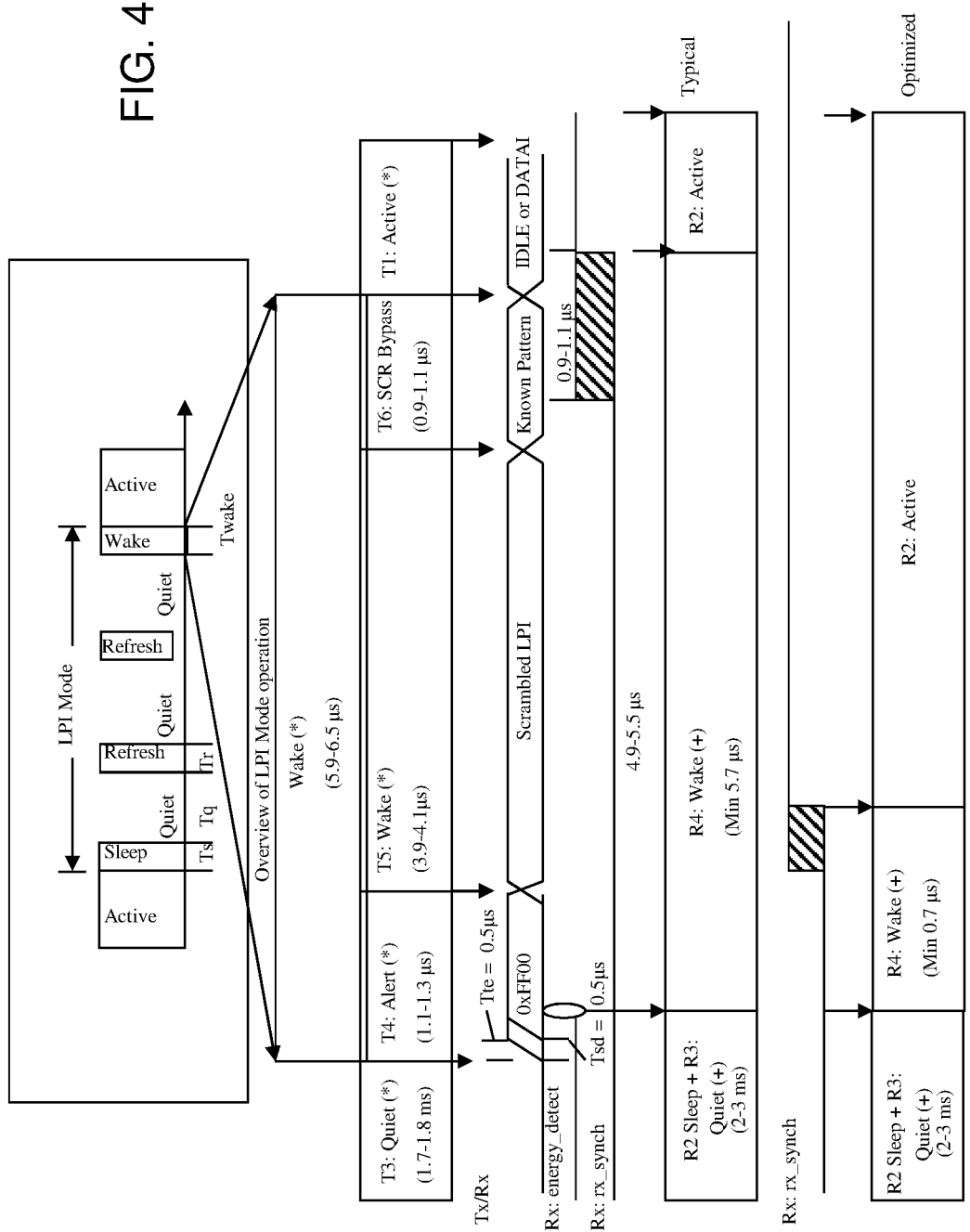
FIG. 4 shows an LPI (Low Power Idle) mode wake up time schematic, comparing processes in accordance with aspects of the present invention.

The invention relates to codeword synchronization and, more particularly, to efficient codeword synchronization methods and systems for fiber channel (FC) protocol. In more specific embodiments, the efficient codeword synchronization methods and systems described herein use the first 5 bits of every 257 bit transmission word to perform normal or rapid synchronization, in order to identify a boundary of each codeword. This greatly reduces the time to achieve lane lock for normal synchronization, e.g., only takes 376 ns (two codeword) in 32 G speed rather than 1 ms. In fact, in total, the techniques provided herein will save nearly 1 ms in a worst case, and 500 µs in average. The efficient codeword synchronization methods and systems also reduce the wake time in a receiver, saving about 5 µs for rapid codeword synchronization (as shown in FIG. 4). Also, the efficient codeword synchronization methods and systems simplify the mechanism of rapid codeword synchronization, which will not need to bypass the scrambler in PCS. In this way, the efficient codeword synchronization methods and systems are more efficient and reliable than conventional techniques.

Advantageously, the techniques described herein are compatible with the method defined in FC-FS-4. In fact, the techniques described herein can be used as a pre-process logic for normal codeword synchronization. Also, the techniques described herein can greatly reduce the time that is taken when using certain protocols, e.g., NOS (Not Operational Primitive Sequence), OLS (Off_Line Primitive Sequence), LR (Link_Reset Primitive Sequence), LRR (Link_Reset_Response Primitive Sequence), used to communicate with link partner. Moreover, the techniques described herein can use any scrambled or unscrambled codeword to perform rapid codeword synchronization, compared to conventional rapid codeword synchronization methods which require unscrambled codeword to detect the boundary. Accordingly, the techniques described herein can extend the detection window of rapid codeword sync, from 1 µs to about 5.7 µs. And, the techniques described herein can use unified logic (e.g., same logic) for both normal synchronization and rapid synchronization.

It should also be recognized that in rapid codeword synchronization, the techniques, e.g., processes and systems described herein, apply a more reliable way to obtain codeword boundary. First, there is a large window which goes up to 5.7 µs for the FEC core to find the codeword boundary. Second, the logic described herein adds little area (~7 k gates) compared to unscrambled pattern detection method.

Figure 1:
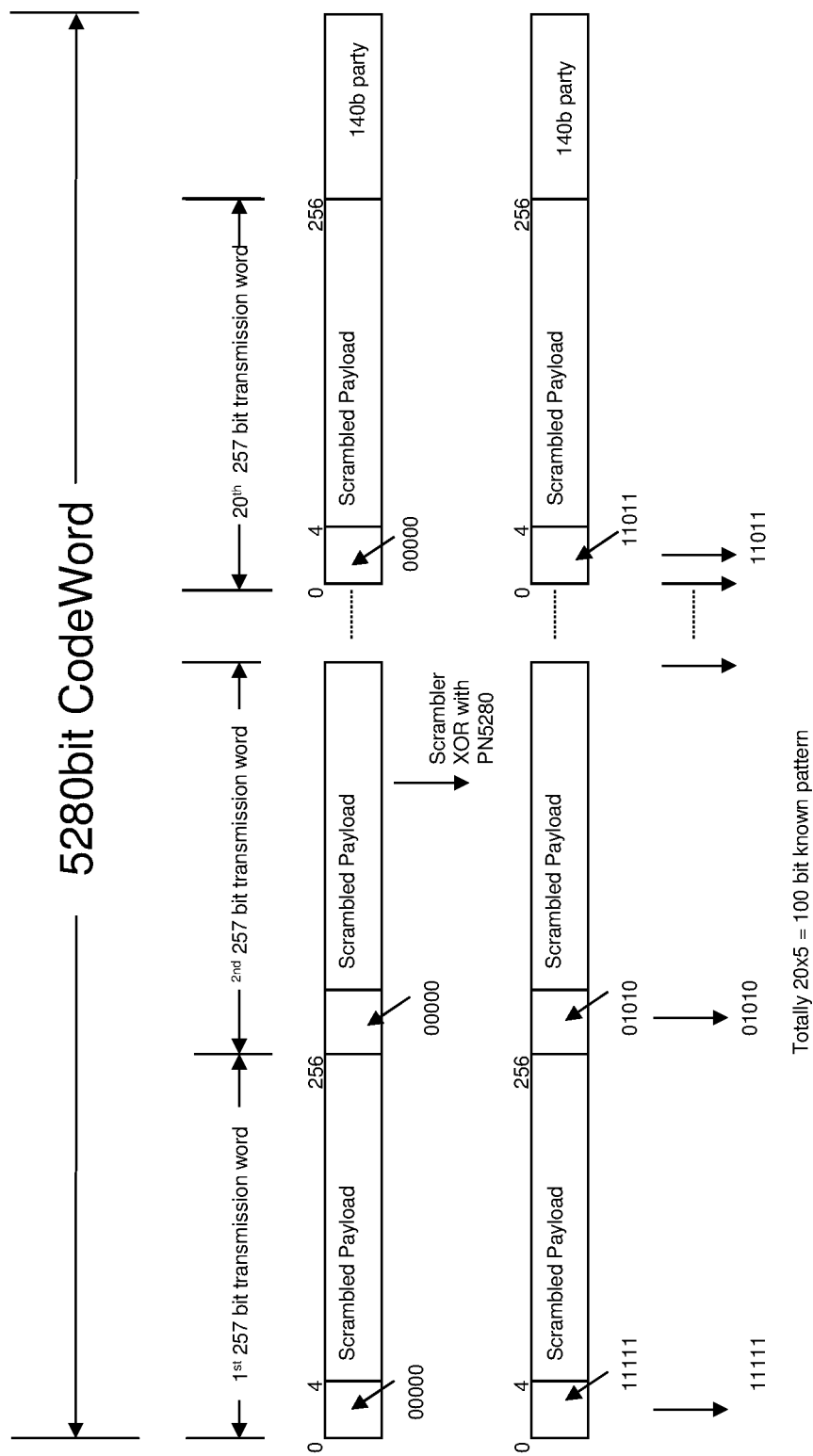
FIG. 1 representatively shows a 5280 bit codeword scheme, implementing processes of the present invention.

FIG. 1 representatively shows a 5280 bit codeword scheme, which can be used in implementing processes (techniques) of the present invention. More specifically, as shown in FIG. 1, the efficient codeword synchronization methods and systems provide a technique of identifying a codeword boundary in a transmission (a single transmission over a network) by detecting 100-bit known patterns in every 5280-bit codeword. Note that each codeword has 20 transmission words and each transmission word has 257-bits, with a 140 parity bit header, (e.g., 257*20+140=5280 bits). As should also be understood, 100 bit zeroes (e.g., 5×20=100) are provided in every codeword before going into an FEC (Forward Error Correction) scrambler.

Also, as shown representatively in FIG. 1, all transmission words can be identified by control blocks. For example, in LPI mode, the PCS only sends out IDLE or LPI block, each of which consists of control blocks. In normal mode, the FC endpoint sends out IDLE or other primitive sequence (e.g., NOS, OLS, LR, LRR) after a detected lost lock. Then, every codeword (5280 bits) will be scrambled by a constant pattern (e.g., PN-5280) after the RS decoder module, with the 100 bit zeros also being scrambled. But the 100 bit zeros still have a known pattern because every codeword is XOR with PN-5280, bit by bit. In this way, it is possible to know a 100 bit pattern (e.g., 5×20=100) in every codeword, e.g., 11111, 01010, 11011, etc.

Figure 2:
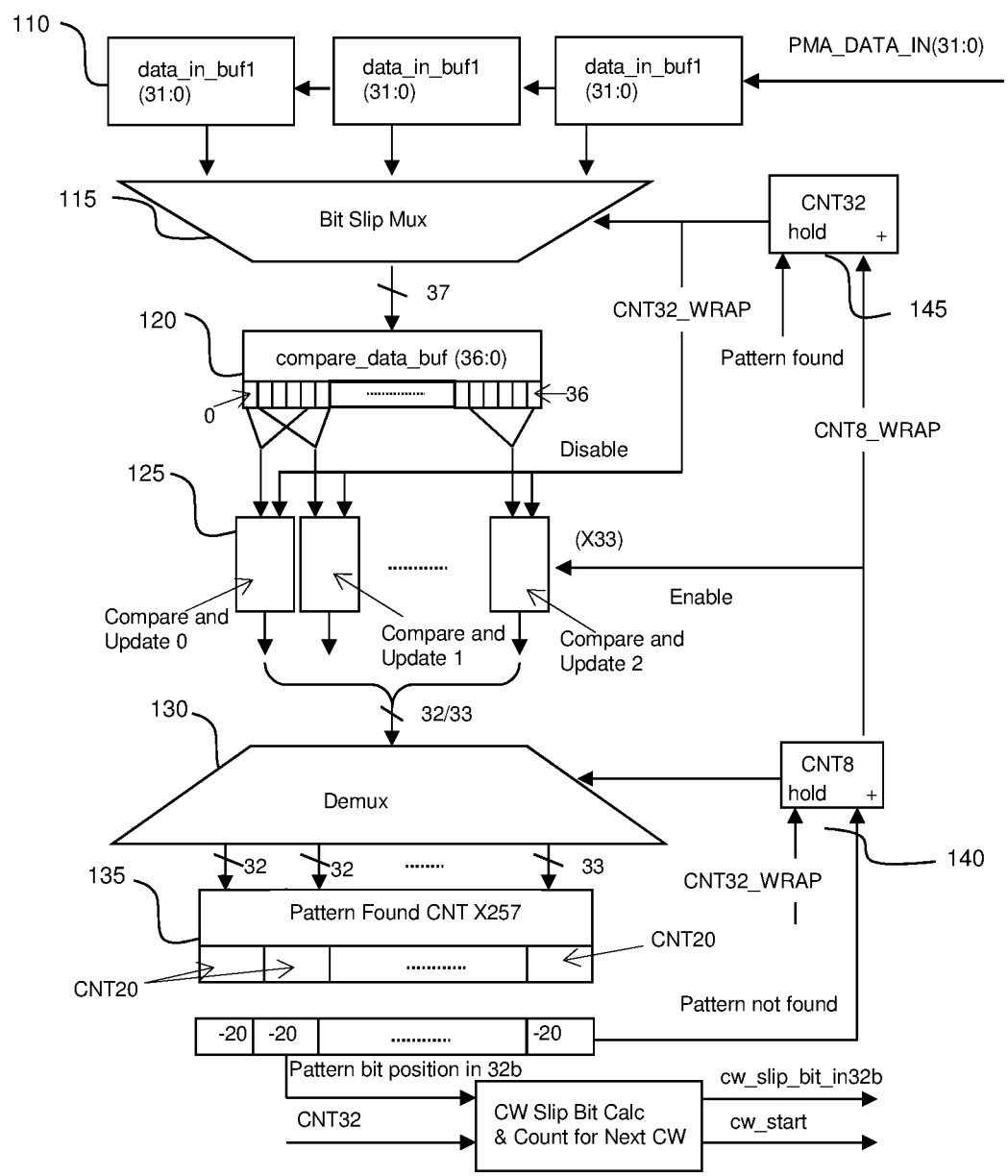
FIG. 2 shows an illustrative circuit in accordance with aspects of the present invention.

FIG. 2 shows a circuit in accordance with aspects of the present invention. In embodiments, the circuit 100 shows an illustrative implementation of detection logic used to find a 100 bit known pattern inside one codeword. In embodiments, this circuit 100 is compatible with the FC FEC IP core normal synchronization process, with its function mainly performing a pre-process for an RS decoder module. In embodiments, by implementing aspects of the present invention, this 100 bit detection logic can be bypassed if necessary.

As described in detail herein, at the input port of RS-FEC (Forward Error Correction) unit, the circuit 100, e.g., implementing the efficient codeword synchronization methods, samples 257-bit data from an FC link, then, every 257-bit data is used to detect a 5-bit known pattern for all candidate 257 positions. If the circuit 100 finds all 20 5-bit known patterns on one candidate position sequentially, all 100 bits known pattern is found and the codeword boundary can be identified. Once the boundary is identified (found), a position offset is outputted by the circuit 100, which can be used by an FEC Transmission Word Synchronization FSM (Finite State Machine) to achieve transmission word synchronization for a transmission of codewords. Furthermore, the circuit 100 can also perform Rapid Codeword Synchronization (RCS) in FC-EE (energy efficient) mode. Advantageously, by implementing the techniques provided by the circuit 100, the efficient codeword synchronization methods and systems save about 500 μs on average by greatly reducing the time of performing normal codeword synchronization.

More specifically, in FIG. 2, 32 bits of data are provided to buffers 110. The buffers 110 will send the 32 bits of data to a bit slip Mux 115. The bit slip Mux 115 will combine the sampled data bits and will send the single stream of sampled data bits to a compare data buffer 120. The compare data buffer 120 will provide the buffered data stream to compare and update logic 125, where the first 5 bits of each transmission word can be identified. More specifically, the compare and update logic 125 will detect all possible positions of the data bits in one transmission word, for each transmission word. The results are provided to a demux 130, where the data bits for each transmission word are provided to a pattern found counter 135, with the possible positions of the data bits for each transmission word. The pattern found counter 135 includes 257 counters, e.g., equivalent to 257-bits for each transmission word, in order to find the 257 candidate positions for the first 5 bits for each transmission word. In embodiments, each pattern found counter 135 will find the 5 bit pattern for the 20 bit transmission words in the codeword, in order to find the first 5 bits in each transmission word.

In embodiments, if a pattern is not found, the demux and pattern found counter will cycle through additional counts, e.g., 8 counts, using counter 140. Also, if a pattern is not found, the process will also cycle through to the Mux 115, using counter 145. As should be understood, 8 clock cycles are required to collect all bits of the transmission words from an HSS (High-Speed Serial) interface. It should also be understood that for every 8 cycles, the FEC core receives a single transmission word. If a pattern is found, though, the counters 140, 145 will be put on hold. In this way, all 100 bit known patterns can be found.

In even more specific embodiments and still referring to the circuit 100 of FIG. 2, each cycle will detect a 5-bit known pattern on 32 candidate bits from input data (e.g., 1 cycle on 33 candidate bits in 8 cycles, e.g., 32×7+33=257 candidate bits are detected). In embodiments, the detected results of 257 candidate bits are recorded in term of CNT20 in the pattern found counter 135 (e.g., each cycle 32 or 33 results are updated, with CNT20 added only when patterns hit in sequence continuously). When a 100 bit pattern is found (CNT20==20), e.g., 20×5=100 bit pattern, the next codeword cycle will start and the codeword slip bit in 32-bit data input will be calculated. In this way, a codeword boundary is detected.

It should also be understood that each cycle Bit_Slip_Mux 115 selects 37-bit data from data_in_buffer 1, 2, 3 based on the value of the counter 145, e.g., CNT32 value. Then the 32-bit data is shifted. Thirty three comparers (e.g., compare and update logic 125) are introduced to detect the 20 dedicated 5-bit patterns for each 5-bit data in compare_data_buffer. In embodiments, the 33rd comparer (compare and update logic 125) is only enabled when CNT8==8 (e.g., counter 125 equals 8 cycles), so 32×7+33=257 candidate bits are compared. Also, each cycle 32 or 33 (when CNT=8) compare results are updated into the 257 pattern_found counters, e.g., pattern found counter 135, for each candidate bit based on the CNT8 value (e.g., value of the counter 140) to record the pattern found situation.

In embodiments, the compare and update logic 125 can implement the following rules:

if (CNT20=i && comparer hit on Pattern i+1) →CNT20++;
else if (comparer hit on Pattern 1) then CNT=1; and
else→CNT=0.

Also, when CNT32 wraps, it is a dead cycle, and the compare and update logic 125 will disabled and CNT8 (counter 140) will be placed in hold state. It should be understood that CNT20==20 represents an instance when the codeword boundary is found. At this time, using current CNT32 value, e.g., value of the counter 145, (257 candidate bits boundary slip bit in 32-bit data in) and the 20th pattern hit position in current 32-bit compared data, the codeword slip bit in 32-bit data in and next codeword start cycle can be calculated. By way of a specific example, CNT32=5, pattern hit position=2→ the 20th 257 bit starting bit (257×19+1=4884th bit in 5280) in 32 bit is 5+2=7;

the rest 397 bit=12×32+13b;
so count 12−1=11 cycle (when pattern hit, one cycle has passed) for next codeword and the codeword boundary slip bit in 32 bits is 13+7=20.

Figure 3:
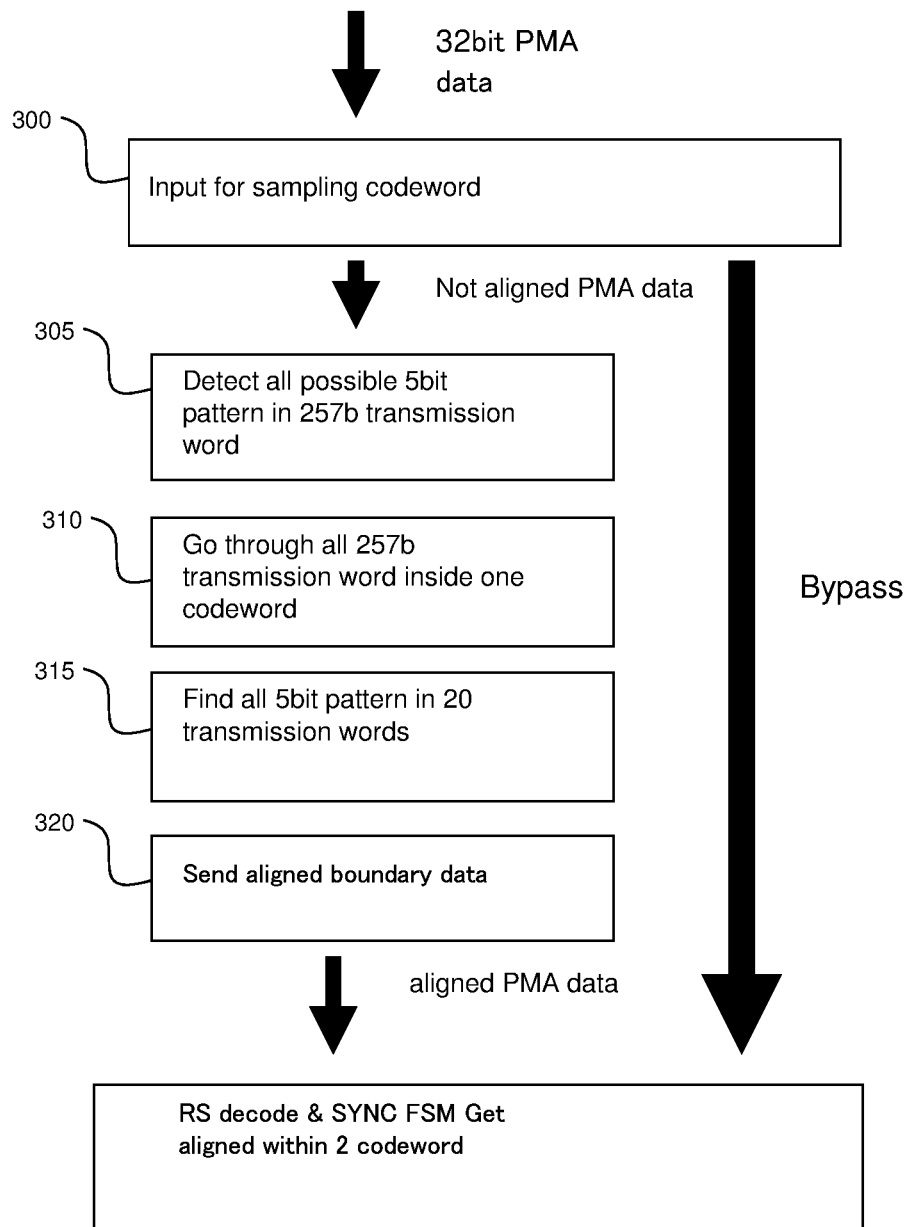
FIG. 3 shows a flow diagram implementing processes in accordance with aspects of the present invention.

FIG. 3 shows a flow diagram implementing processes in accordance with aspects of the present invention. The steps of FIG. 3 can be implemented in the illustrative circuit shown in FIG. 2. At step 300, a 32 bit data is provided for sampling of the codeword. If the data is not aligned, at step 305, the processes and systems described herein will detect all possible 5 bit patterns in a 257 bit transmission word. At step 310, the processes and systems described herein will go through all 257 bit transmission words inside one codeword. At step 315, all of the 5 bit patterns in the 20 transmission words are found. At step 320, the data will be sent with an aligned boundary to an RS decoder and an FEC Transmission Word Synchronization FSM, in order to be aligned within 2 codewords. If all of the data is aligned, the processes will bypass steps 305-320, bringing the aligned data directly to the RS decoder and an FEC Transmission Word Synchronization FSM, in order to be aligned within 2 codewords.

FIG. 4 shows an LPI mode wake up time schematic, implementing processes in accordance with aspects of the present invention. More specifically, FIG. 4 shows a timing diagram comparing the techniques described herein and conventional techniques, in LPI mode. In the optimized technique of the present invention, FIG. 4 shows a wake up time of considerably shorter duration, e.g., 0.7 μs. Accordingly, the optimized technique of the present invention saves about 5 μs for rapid codeword synchronization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A logic circuit for performing codeword synchronization in a transmission over a network, wherein the logic circuit is configured to:
   identify a codeword boundary by detecting known patterns in a bit codeword in the transmission; and
   sample bit data from a fiber channel (FC) link, wherein the bit data is used to detect the known patterns for all candidate positions in the bit codeword,
   wherein each bit codeword has 20 transmission words and each transmission word has 257-bits.

2. The logic circuit of claim 1, wherein the logic circuit is configured to find known patterns on one candidate position sequentially.

3. The logic circuit of claim 2, wherein when the known patterns on one candidate position sequentially are found, the codeword boundary is identified.

4. The logic circuit of claim 1, wherein each bit codeword has 100 bit zeroes.

5. The logic circuit of claim 1, wherein the logic circuit is configured to sample 257-bit data from the FC link to detect the known patterns.

6. The logic circuit of claim 5, wherein the identifying comprises finding all 20 5-bit known patterns on one candidate position sequentially.

7. The logic circuit of claim 6, wherein the logic circuit is configured to output a position offset in response to identifying the codeword boundary.

8. The logic circuit of claim 7, wherein the position offset is used by an Forward Error Correction (FEC) Transmission Word Synchronization Finite State Machine (FSM) to achieve transmission word synchronization.

9. A logic circuit for performing codeword synchronization in a transmission over a network, wherein the logic circuit is configured to:
   identify a codeword boundary by detecting known patterns in a bit codeword in the transmission;
   sample bit data from a fiber channel (FC) link, wherein the bit data is used to detect the known patterns for all candidate positions in the bit codeword;
   find known patterns on one candidate position sequentially, wherein when the known patterns on one candidate position sequentially are found, the codeword boundary is identified; and
   output a position offset to achieve transmission synchronization when the codeword boundary is identified.

10. A logic circuit for performing codeword synchronization in a transmission over a network, wherein the logic circuit is configured to:
    detect dedicated bit patterns for bit data in each transmission word of a codeword to determine a boundary of the codeword; and
    detect a known pattern on candidate bits from input data candidate bits and recording the detected results of the candidate bits in a pattern found counter,
    wherein when a bit pattern is found for the codeword, a next codeword cycle starts and a codeword slip bit in the bit data input is calculated.

11. The logic circuit of claim 10, wherein the candidate bits are provided to the logic circuit for sampling of the codeword.

12. The logic circuit of claim 10, wherein the logic circuit is configured to detect all possible bit patterns in a bit transmission word.

13. The logic circuit of claim 12, wherein the logic circuit is configured to find all bit patterns in transmission words of the codeword.

14. The logic circuit of claim 13, wherein the logic circuit is configured to send the codeword and an aligned boundary to a decoder and a transmission word synchronization state machine.

* * * * *